United States Patent [19]
Parkinson

[11] 3,950,986
[45] Apr. 20, 1976

[54] NON-CONTACTING SHAFT HORSEPOWER MEASUREMENT SYSTEM

[75] Inventor: James R. Parkinson, Vergennes, Vt.

[73] Assignee: Simmonds Precision Products, Inc., Tarrytown, N.Y.

[22] Filed: June 26, 1972

[21] Appl. No.: 266,480

[52] U.S. Cl.............................................. 73/136 A
[51] Int. Cl.² ......................................... G01L 3/10
[58] Field of Search ................................. 73/136 A

[56] References Cited
UNITED STATES PATENTS

| | | | |
|---|---|---|---|
| 2,586,540 | 2/1952 | Holden | 73/136 A |
| 2,640,352 | 6/1953 | Ellison et al. | 73/136 A |
| 3,538,762 | 11/1970 | Parkinson et al. | 73/136 A |
| 3,545,265 | 12/1970 | McIlraith et al. | 73/136 A |
| 3,604,255 | 9/1971 | Bart | 73/136 A |

FOREIGN PATENTS OR APPLICATIONS

| | | | |
|---|---|---|---|
| 1,509,098 | 12/1967 | France | 73/136 A |
| 1,224,956 | 4/1964 | Germany | 73/136 A |

Primary Examiner—Charles A. Ruehl
Attorney, Agent, or Firm—Edwin E. Greigg

[57] ABSTRACT

A non-contacting shaft horsepower measurement system in which a torque indicating signal is obtained from the phase shift between a pair of signals derived from two sensors sensing the passage of a torque responsive toothed wheel and a reference toothed wheel spaced on the shaft, this torque signal being then multiplied by a speed signal derived from a third sensor thereby developing a signal proportional to instantaneous horsepower.

9 Claims, 5 Drawing Figures

NON-CONTACTING SHAFT HORSEPOWER MEASUREMENT SYSTEM

BACKGROUND OF THE INVENTION

The measurement of instantaneous horsepower is important in many applications involving ship and aircraft propulsion. Torque meters are presently used in these applications wherein it remains for the operator to determine the shaft horsepower by utilizing torque and shaft speed information. Non-contacting torque meters have been devised which sense torque by deriving a pair of phase related A.C. signals in which the phase shift is indicative of the twist in the shaft and therefore the torque.

A number of these systems are described in my U.S. Pat. Nos. 3,548,649 "Torque Measurement System Utilizing Shaft Deflection and Phase Displacement Technique" issued Dec. 22, 1970, and 3,538,762 "Phase Displacement Torque Measuring System with Shaft Misalignment Compensation Technique", issued Nov. 10, 1970.

These techniques use as a basis for the measurement a reference assembly comprising a first toothed wheel which will be called the reference toothed wheel mounted on a sleeve which is, in turn, mounted to the shaft to be measured. A second torque responsive toothed wheel is mounted to the shaft spaced a known distance from the point at which the reference assembly is attached to the shaft thus, as the shaft twists due to torque, the reference toothed wheel and the torque responsive toothed wheel move rotationally with respect to each other which can be detected by a pair of sensors as a phase change and using appropriate circuitry displayed as torque. The referenced patents have further modifications to compensate for shaft and sensor misalignment and to increase accuracy, however, the basis of torque measurement is the same.

Speed sensing is presently an accomplished fact in propulsion systems for ships and aircraft and therefore a speed signal is readily available and can be processed into a horsepower measurement system. By multiplying torque times shaft rpm an indication of horsepower can be obtained.

Known methods of measurement use contacting methods, such as electrical or mechanical brakes and require considerable equipment and expense without the benefits of measurement under actual operation conditions. Thus, the horsepower is derived in actual use by noting certain operating conditions, such as fuel consumption, speed, etc., which does not take into account losses due to inefficiency as the prime mover becomes older.

It is therefore an object of this invention to provide an accurate measurement system for determining the instantaneous horsepower output of a prime mover under actual operating conditions while in use.

It is another object of this invention to provide an accurate system for the measurement of the instantaneous horsepower output of a prime mover by non-contacting means.

It is a further object of this invention to provide an accurate system for the measurement of instantaneous horsepower output of a prime mover which is compact and will fit into a small space.

Still another object of this invention is to provide an accurate system for the measurement of instantaneous horsepower output of a prime mover which uses rotating sensing means for measurement at low rpm.

Still a further object of this invention is to provide an accurate system for the measurement of instantaneous horsepower output by a prime mover which is adaptable to torque measurement systems that provide compensation for shaft and sensor misalignment.

Yet another object of this invention is to provide an accurate system for the measurement of instantaneous horsepower output of a prime mover which has direct readout at a remote station.

These and other objects of this invention will become clear upon a careful reading of the specification along with the drawings and appended claims.

DESCRIPTION OF THE PREFERRED EMBODIMENT

Figure 1:
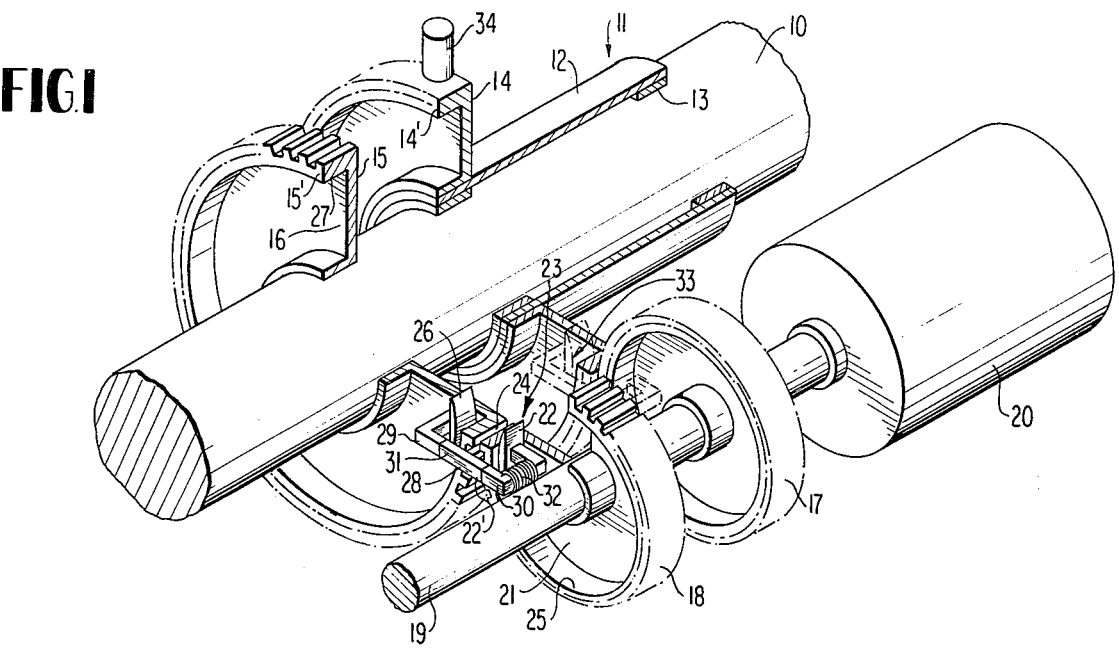
FIG. 1 shows a preferred embodiment having a shortened magnetic path over previously used systems.

Referring to FIG. 1 there is shown shaft 10 on which is mounted reference assembly 11 consisting of sleeve 12 rigidly affixed to ring 13 which is rigidly affixed to shaft 10 so that sleeve 12 is spaced from shaft 10 but rotates with it and reference toothed wheel 14 which is rigidly mounted on the opposite end of sleeve 12 as shown. Rigidly affixed to shaft 10 is torque responsive toothed wheel 15 which also rotates with shaft 10. Both the reference toothed wheel 14 and the torque responsive toothed wheel 15 have axial relief 16 below the toothed surface providing a thin rim 14' and 15', respectively, below the teeth to provide clearance for the sensor pick-up assembly to be presently described. Mounted in the plane of reference toothed wheel 14 so that the teeth pass in close proximity to it forming air gap 24 is toothed exciter wheel 17. Mounted in the plane of torque responsive toothed wheel 15 so that the teeth pass in close proximity to it as toothed exciter wheel 18. Both exciter toothed wheels 17 and 18 are mounted on the same shaft 19 and are driven together at the same speed by motor 20. Both toothed exciter wheels 17 and 18 have axial relief 21 for purposes to be presently discussed.

Mounted within axial relief 21 of exciter wheel 18 is sensor shoe 22 of torque responsive sensor 23 facing inner cylindrical surface 25 which communicates magnetically through air gap 24 with a similar sensor shoe 26 mounted within axial relief 16 of toothed torque responsive wheel 15 and facing the inner cylindrical surface 27. Connecting sensor shoe 22 and sensor shoe 26 is magnetic core 28 comprising two magnetic steel end portions 29 and 30 connected by magnet 31 which establishes the quiescent flux in the magnetic circuit. Wound around core portion 30 is sensor coil 32 which senses the changes in magnet flux as the air gap 24 changes due to the passing of the teeth of the toothed torque responsive wheel 15 and toothed exciter wheel 18. In a similar manner, sensor assembly 33 is mounted to sense the flux changes in the air gap between exciter toothed wheel 17 and reference toothed wheel 14.

It will be recognized that the structure thus far described can be used to measure the torque transmitted by the power shaft even at zero speed as described in my copending patent application Ser. No 266,479, filed June 26, 1972, entitled "Phase Displacement Measuring Apparatus for Measuring a Characteristic of a System When the System is at a Standstill."

To measure horsepower a third sensor is provided to measure the absolute speed of shaft 10. Mounted in close proximity to reference toothed wheel 14 is stationary magnetic sensor assembly 34 which is utilized to sense the rotational speed of reference toothed wheel 14. Thus, the elements of torque and speed are measured from which instantaneous horsepower can be derived as will presently be shown.

Figure 2:
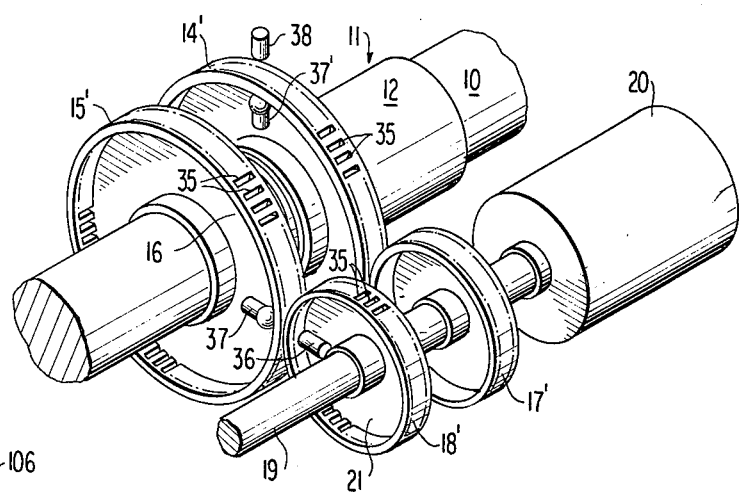
FIG. 2 shows an embodiment using light cell sensing instead of magnetic sensing.

Referring to FIG. 2, there is shown, by way of example, a structure with identical function to that shown in FIG. 1, but using light sensing elements. Shaft 10 has mounted upon it reference assembly 11 comprising sleeve 12 mounted at one end to shaft 10 with reference wheel 14' mounted upon it at the other end. Reference wheel 14' has perforated into its rim uniformly spaced slots 35 through which light may pass. In a manner similar to the structure of FIG. 1, torque responsive wheel 15' is spaced from reference wheel 14' and is mounted upon shaft 10 so that as shaft 10 twists due to torque, the torque wheel 15' moves rotationally with respect to reference wheel 14'. Torque wheel 15' also has perforated into its rim uniformly spaced slots 35 through which light may pass. Mounted in close proximity to and in the plane of reference wheel 14' is exciter wheel 17' with its rim perforated with uniformly spaced slots 35 and in a like manner mounted in the plane of torque responsive wheel 15' is exciter wheel 18' also with its rim perforated with uniformly spaced slots 35, both exciter wheels 17' and 18' being mounted on the same shaft 19 so they are driven together at the same speed by motor 20.

Mounted within axial relief 21 of exciter wheel 18' is light sensor 36 and within axial relief 16 is light source 37. As should be apparent, when a slot in torque responsive wheel 15' aligns itself with a slot in exciter wheel 18', light passes through to light sensor 36.

A similar light source (not shown) is mounted within the axial relief of reference wheel 14' and a cooperating light sensor (not shown) is conveniently supported within the axial relief of exciter wheel 17'.

Mounted within the axial relief 16' of reference wheel 14' is a second light source 37' and mounted in close proximity, but outside of the outer rim of reference wheel 14' and on the same radius as the second light source 37', is light sensor 38. Thus, as the slots 35 of reference wheel 14' pass between the second light source and its cooperating sensor, light passes through the slots to actuate the light sensor 38, thereby allowing the light sensor and its associated circuit to measure the speed of the reference wheel 14'.

It should be obvious from these two examples that other forms of the sensing of torque and speed may be effectively used, for example, one may use Hall effect devices or eddy current sensors, both of which would accurately detect the location of the gear teeth of FIG. 1.

Figure 3:
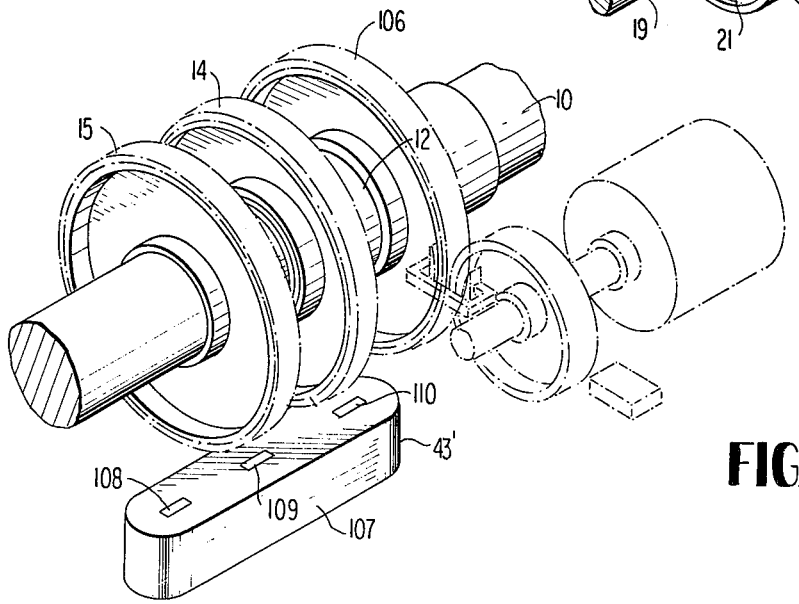
FIG. 3 shows application to a three wheel position compensated phase displacement torque measurement system.
Figure 5:
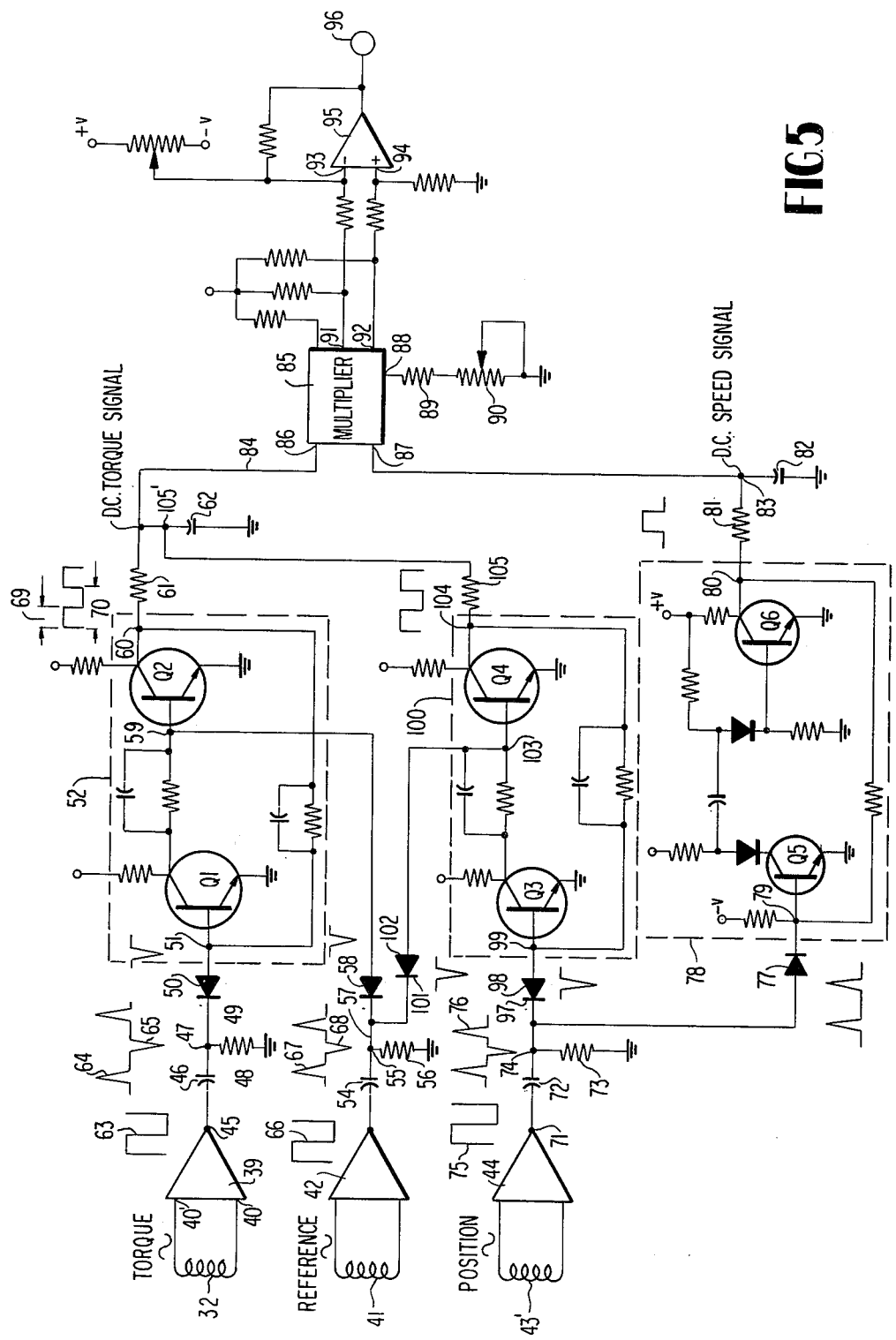
FIG. 5 shows a circuit for deriving the horsepower readout from a three wheel position compensated phase measuring system as shown in FIG. 3.

In application of this invention to other phase detecting torque measurement systems, the speed of the rotating power shaft may be derived from sensors already present and the signal processed to obtain horsepower. By way of example, FIG. 3 shows a three wheel "Phase Displacement Torque Measuring System With Shaft Misalignment Compensation Technique" as described in my U.S. Pat. No. 3,538,762, issued Nov. 10, 1970. Referring to FIG. 3, there is shown shaft 10 with toothed shaft position wheel 106 mounted upon it. Reference means 11 is mounted as in FIG. 1 with sleeve 12 mounted to shaft 10 and toothed reference wheel 14 mounted to sleeve 12. Toothed torque responsive wheel 15 is spaced from toothed reference wheel 14 a distance equal to that between toothed shaft position wheel 106 and toothed reference wheel 14. Mounted in proximity to the three toothed wheels is stationary sensor means 107 comprising three magnetic or other sensors 108, 109 and 110, respectively, wherein the sensor 110 associated with the toothed shaft position wheel is used to compensate for shaft-sensor misalignment, however, it may also be used to sense absolute speed and thus serve two functions simultaneously. A circuit for processing of the signals is shown in FIG. 5 and will clearly show the function of each of the signals.

The exciter wheels illustrated in FIG. 1 can be used in the three wheel system, but in this case a separate stationary sensor must be used to sense the speed of toothed shaft position wheel 106 or the stationary sensor must be used to sense the speed of the associated exciter wheel and the wheel speeds added or subtracted utilizing appropriate circuits depending upon their direction of rotation, to obtain true shaft speed. In the latter case, the horsepower may be measured at very low shaft rpm.

Horsepower is a product of torque speed and a constant which can be described by the equation:

$$HP = (K)(RPM)(Torque)$$

Therefore, those signals derived from the structure of FIGS. 1 and 2 must be processed to generate analog voltages proportional to speed and torque and then multiplied to obtain horsepower which can be displayed on a meter or digital meter readout.

Figure 4:
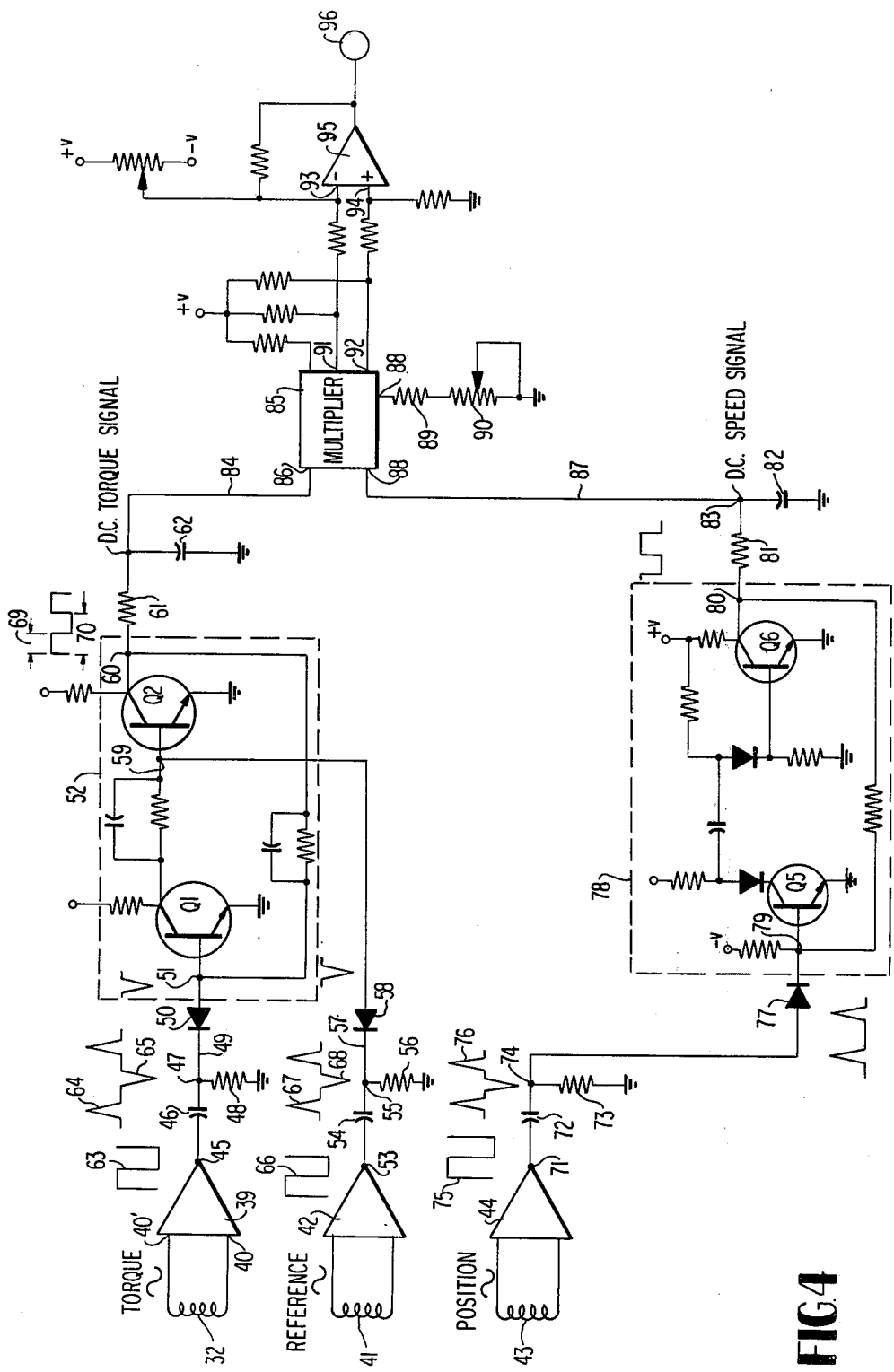
FIG. 4 shows one circuit to derive the horsepower readout from a two wheel torque measuring system as shown in FIG. 1.

One method of converting the sensor signals from FIG. 1 into speed, torque and horsepower is shown in FIG. 4.

Referring to the left-hand portion of FIG. 4, there is shown coil 32 of torque responsive sensor 23, one end of which is connected to one input 40 of differential comparator 39 and the other end is connected to second input 40' of differential comparator 39. In a like manner, the coil 41 of reference sensor assembly 33 is connected to differential comparator 42 and the coil 43 of stationary speed sensor 34 is connected to differential comparator 44. The output of differential comparator 39, point 45 is connected to one plate of capacitor 46, the other plate being connected at point 47 to one end of resistor 48, with the other end of resistor 48 being connected to ground. Thus, capacitor 46 and resistor 48 form an RC differentiating network. Also connected to point 47 is lead 49 which connects to the cathode of diode 50. The anode end of diode 50 is connected to one input 51 of flip-flop 52 formed by transistors $Q_1$ and $Q_2$ and parellel RC networks connected, respectively, between the collector of $Q_1$ and the base of $Q_2$ and the collector of $Q_2$ and the base of $Q_1$.

The output of differential comparator 42, point 53 is connected to one plate of capacitor 54, the other plate being connected at point 55 to one end of resistor 56. The other end of resistor 56 is connected to ground. Thus, capacitor 54 and resistor 56 form an RC differentiating network. Also connected to point 55 is lead 57 which is connected to the cathode of diode 58. The anode of diode 58 is connected to the second input 59 of flip-flop 52. The output of flip-flop 52, taken from the collector of transistor $Q_2$ at point 60 is connected through resistor 61 to one end of integrating capacitor 62.

The AC voltages induced in coil 32 are applied to the input of differential comparator 39 which because of its high gain generates a square wave 63 at its output 45. The sides of the square wave 63 occur at the point where the sensor signals cross the zero voltage level. The square waves 63 are differentiated by the RC network made up of capacitor 46 and resistor 48 to form sharp positive and negative spikes 64 and 65 corresponding to the zero crossing points of the sensor signals. Diode 50 rectifies the signal passing only the negative spikes 65 to input 51 of flip-flop 52.

In a like manner, the induced voltage in coil 41 of the reference sensor 33 is applied to differential comparator 42, the output of which is a square wave 66 which is differentiated into positive and negative spikes 67 and 68. Only the negative spikes 68 are passed by diode 58 to be applied to the second input 59 of flip-flop 52. The flip-flop 52 is triggered to one condition by the negative spike generated by coil 32 and is triggered a fraction of a second later by the negative spike generated by coil 41. The pulse width 69 of the flip-flop output signal is determined by the phase difference between toothed torque wheel 15 and toothed reference wheel 14, whereas the cycle width 70, i.e., the repetition frequency of the signal is determined by the distance between the teeth on said toothed wheels and their rotational speed. The duty cycle of the square wave which is dependent upon the torque is therefore the phase difference, 69 divided by the cycle time 70. The output signal of the flip-flop is applied to the RC filter comprising resistor 61 and capacitor 62 which develops an analog voltage proportional to shaft torque.

Referring now to the lower left-hand portion of FIG. 4, the output of differential comparator 44, point 71 is connected through capacitor 72 to one end 74 of resistor 73, the other end of which is connected to ground. Capacitor 72 and resistor 73 form an RC differentiating network which differentiates the square wave output 75 into sharp spikes 76. This signal is then applied to the anode terminal of diode 77 which is biased so as to pass only the positive spikes to the input 79 of monostable multivibrator 78. Multivibrator 78 generates a series of constant width, constant amplitude pulses at the output, point 80, at a rate proportional to the speed of shaft 10. The output signal is then applied to the RC filter made up of resistor 81 and capacitor 82. The output square wave of the monostable multivibrator has a duty cycle proportional to speed and therefore an analog voltage proportional to speed is developed at point 83.

The D.C. analog torque signal is applied through line 84 to one input 86 of multiplier 85 and the D.C. analog speed signal is applied through line 87 to the other input 88 of multiplier 85. Connected to input 88 of multiplier 85 is resistor 89 in series with potentiometer 90, the other side of which is connected to ground. The setting of potentiometer 90 provides an adjustment to provide a selected constant multiplier factor so that the output of multiplier 85 will be a D.C. voltage signal proportional to horsepower of shaft 10. The output terminals 91 and 92 are connected to the inputs 93 and 94 of amplifier 95 which amplifies but does not affect the horsepower signal. The meter 96 may be connected at a remote location to provide a direct readout either by direct connection or by a telemetric arrangement.

The horsepower system can be applied to other phase measurement systems. To apply this system to the three wheel phase measurement system of FIG. 3, the speed signal is taken from the position wheel sensor rather than from a second stationary sensor 34 as shown in FIG. 1.

Referring to FIG. 5, there is shown in the left-hand portion of the figure, coil 43' which represents the position wheel sensor 110 of FIG. 3. After filtering by the RC differentiating network comprising capacitor 72 and resistor 73, the signal is applied to the cathode terminal 97 of diode 98 which is biased such that only the negative spikes are passed to the first input 99 of flip-flop 100. The reference signal developed at point 55 is applied to the cathode terminal 101 of diode 102 biased so that only negative spikes are passed which are then applied to the second input 103 of flip-flop 100. Since the phase of the signal produced by the position toothed wheel 106 and the reference toothed wheel 14 is a function only of shaft-sensor misalignment, the duty cycle of the output signal at point 104 is a function of this misalignment. The theory is clearly described in my U.S. Pat. No. 3,538,762, issued Nov. 10, 1970, as mentioned earlier. The output signal of flip-flop 100 available at output point 104 is applied through resistor 105 to point 105' to add or subtract from the D.C. analog torque voltage, thus correcting for that portion of the torque signal due to misalignment and not torque.

One will recognize that the remainder of the circuit functions as described in FIG. 4. It should be obvious to those skilled in the art that the application of this horsepower measurement system can be applied to any of the phase measurement torque systems cited above by applying the principles taught in this specification and description and that its scope should not be limited to the specific embodiments described.

What is claimed is:

1. A non-contacting sensing system for continuously measuring the horsepower output of a driven shaft member adapted to be rotatably driven comprising, in combination:
  a. first sensing means associated with said shaft member for generating a reference signal,
  b. second sensing means associated with said shaft member for generating a torque responsive signal,
  c. third sensing means associated with said shaft member for generating a speed responsive signal,
  d. first circuit means connected to said first sensing means and said second sensing means and operative in response to the reference and torque responsive signals therefrom for developing a first D.C. analog signal proportional to the torque of said shaft member,
  e. second circuit means connected to said third sensing means and operative in response to the speed responsive signal therefrom for developing a second D.C. analog signal proportional to the speed of said shaft member, and a multiplier circuit connected to receive said first and said second D.C. analog signals, said multiplier circuit being operative to develop at its output a D.C. signal proportional to the product of the first and second D.C. analog signals and corresponding to the horsepower of the driven shaft member, and wherein said first and said second sensing means each include a pair of cooperating wheel members, one of said wheel members being mounted to the shaft member, the other of said wheel members being mounted on a driven shaft and in the plane of said one of said wheel members, and a pick-up assembly for generating said reference and said torque responsive signal.

2. A non-contacting sensing system as set forth in claim 1, wherein said multiplier circuit includes means for adjusting the multiplier factor of said multiplier circuit.

3. A non-contacting sensing system as set forth in claim 2, further including indicator means operatively driven by the output signal of said multiplier circuit to provide a continuous direct readout of the horsepower output of the driven shaft member.

4. A non-contacting sensing system as set forth in claim 3, wherein said indicator means is remotely disposed with respect to the location of the driven shaft to provide a continuous direct readout at a location remote from said driven shaft member.

5. A non-contacting system as set forth in claim 1, wherein said third sensing means is fixed and includes a pick-up assembly positioned adjacent one of the wheel members mounted to the shaft member.

6. A non-contacting system as set forth in claim 1, wherein said first, second and third sensing means include separate wheel members mounted to the shaft member and a stationary sensor means having separate pick-up sensors associated with each wheel member.

7. A non-contacting system as set forth in claim 1, wherein each wheel member includes an axial relief, said wheel member being mounted such that the rims pass in close proximity forming an air gap therebetween, said pick-up assemblies being mounted with elements within the axial reliefs and in sensing communication with each other across the air gap.

8. A non-contacting sensing system as set forth in claim 7, wherein the pick-up assemblies include a magnetic element for establishing a magnetic flux across the air gap.

9. A non-contacting sensing system as set forth in claim 7, wherein the pick-up assemblies include a light source for establishing a light beam across the air gap.

* * * * *